United States Patent [19]

Kataoka

[11] Patent Number: 4,866,345
[45] Date of Patent: Sep. 12, 1989

[54] VEHICLE INTERIOR LAMP SHUT-OFF DEVICE WITH PARTICULAR DIMMING SEQUENCE

[75] Inventor: Sachiro Kataoka, Ebina, Japan

[73] Assignee: Nissan Motor Co., Ltd., Yokohama, Japan

[21] Appl. No.: 114,859

[22] Filed: Oct. 30, 1987

[30] Foreign Application Priority Data

Oct. 31, 1986 [JP] Japan ................... 61-261630

[51] Int. Cl.$^4$ .............................................. B60Q 3/02
[52] U.S. Cl. ........................................ 315/84; 315/77; 307/10.8
[58] Field of Search ............................. 315/77, 84, 360; 307/10 LS

[56] References Cited

U.S. PATENT DOCUMENTS

| | | | |
|---|---|---|---|
| 4,122,371 | 10/1978 | Talmage et al. | 315/84 |
| 4,385,258 | 5/1983 | Voll | 315/84 |
| 4,403,172 | 9/1983 | Sasaki et al. | 315/84 X |
| 4,473,871 | 9/1984 | Fuchshuber | 315/84 X |
| 4,638,174 | 1/1987 | Bier | 315/84 X |

FOREIGN PATENT DOCUMENTS 59-38148  3/1984  Japan ................... 315/84 X

Primary Examiner—James J. Groody
Assistant Examiner—Mark R. Powell
Attorney, Agent, or Firm—Foley & Lardner, Schwartz, Jeffery, Schwaab, Mack, Blumenthal & Evans

[57] ABSTRACT

A vehicle room lamp shut-off device eliminates the annoyance to the driver by reducing the room lamp illumination level by a certain amount as the door is closed, then gradually reducing the illumination level further until the light is off.

10 Claims, 6 Drawing Sheets

FIG.4(a) Signal S1
FIG.4(b) Switching Transistor 32
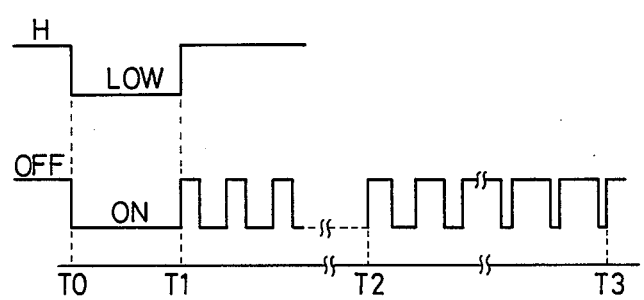
FIG.5
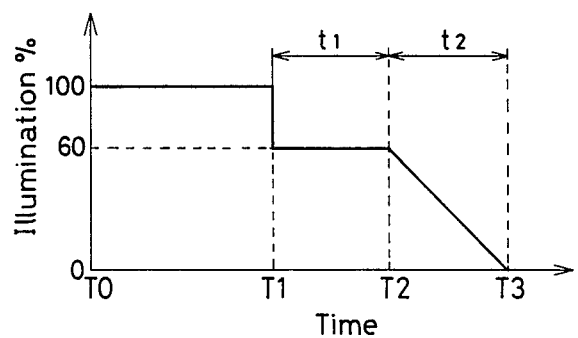
FIG.6(a) Signal S2
FIG.6(b) Switching Trangistor 32

VEHICLE INTERIOR LAMP SHUT-OFF DEVICE WITH PARTICULAR DIMMING SEQUENCE

BACKGROUND OF THE INVENTION

1. Field of the Invention

This invention relates to a vehicle room lamp shut-off device.

2. Description of the Related Art

There are previous models of vehicle room lamp shut-off device, such as the one described in Patent Publication of Unexamined Application No. SHO-59-38148. The device disclosed in the application shuts the room lamp off for a short time when the door is closed, then turns the lamp back on at a lower illumination level than when the door was open, and the illumination level decreases gradually over time until the device finally shuts it off again.

However, in this device, since the room lamp is shut off briefly, even though only for a short time, when the door is closed after having been open, there is an annoying blink, which is interference with key operation, and is unpleasant for the driver.

SUMMARY OF THE INVENTION

The purpose of this invention is to provide a vehicle room lamp shut-off device which eliminates the annoyance to the driver by reducing the room lamp illumination level by a certain amount as the door is closed, then gradually reducing the illumination level further until the light is off.

BRIEF DESCRIPTION OF THE DRAWINGS

FIG. 4(a) is a waveform diagram of the embodiment of FIG. 2 showing the signals from the switch that is coupled to the door on the driver's seat side.

FIG. 4(b) is a diagram of the embodiment of FIG. 2 which shows the on/off duty cycle of the switching transistor.

FIG. 5 shows the time variation of room lamp illumination level of the embodiment of FIG. 2.

FIG. 6(a) is a waveform diagram of the embodiment of FIG. 2 which shows the signals from a switch coupled to a door other than the door on the driver's seat side.

FIG. 6(b) shows the on/off duty cycle of the corresponding switching transistor of the embodiment of FIG. 2.

DETAILED DESCRIPTION OF THE INVENTION

Figure 1:
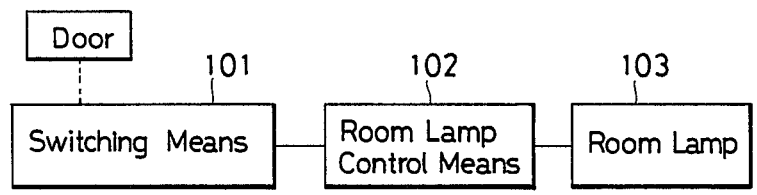
FIG. 1 is a block diagram showing the overall concept of this invention.

The concept of this invention is explained referring to FIG. 1. A room lamp shut-off device conforming to this invention comprises a switching means 101 that outputs signals coupled to the opening and closing of the door, a room lamp 103 that turns on and off in response to the signals from this switching means 101, and a room lamp control means 102 that receives signals from the switching means 101, responds to the closing of the door by reducing the room lamp illumination to a certain level, then gradually reduces the illumination further until the lamp is shut off completely within a certain time.

In this device, when the door is closed, the switching means 101 sends a signal to the room lamp control means 102. The room lamp control means 102 receives this signal and responds to the closing of the door by reducing the illumination of the room lamp 103 to a certain intermediate level, then reducing it further until the lamp is shut off completely within a certain time.

Figure 2:
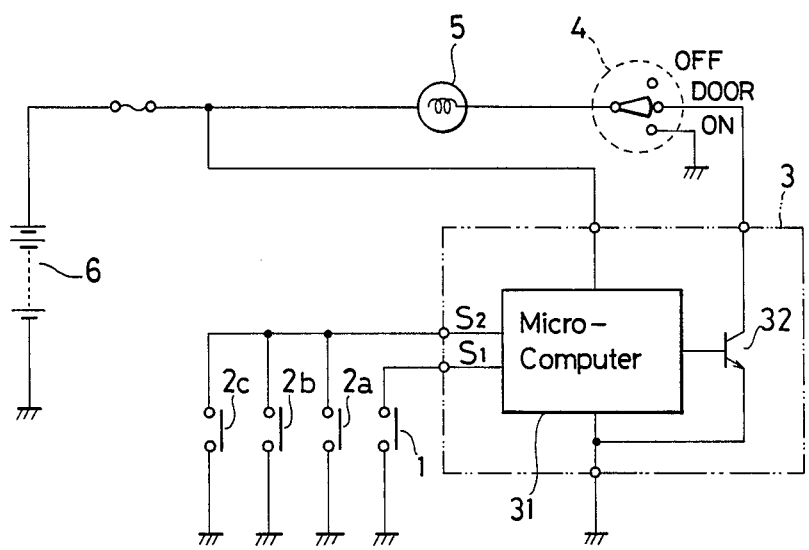
FIG. 2 is the circuit diagram of one embodiment of the present invention.

In FIG. 2, the door switch 1 is turned on by opening the door on the driver's seat side, and turned off by closing that door. The door switches 2a to 2c turn on when the door on the front passenger's side and the two rear doors, respectively, open, and turn off when those doors close. One side of each of these switches is grounded, while the other side is connected to the control circuit 3.

As is well-known the control circuit 3 has a microcomputer 31 consisting of CPU, RAM, ROM, timer, etc., and a switching transistor 32 that switches on and off as it receives lamp drive signals from the microcomputer.

The switching transistor 32 is controlled by the lamp drive signals which are outputted based on the lamp drive processing procedure, which will be explained below.

The collector of the switching transistor 32 is connected to the door terminal of the room lamp switch 4, while the emitter is grounded.

The off terminal of the room lamp switch 4 is open, the on terminal is grounded, and the input terminal is connected to the battery 6 through the room lamp 5.

Figure 3:
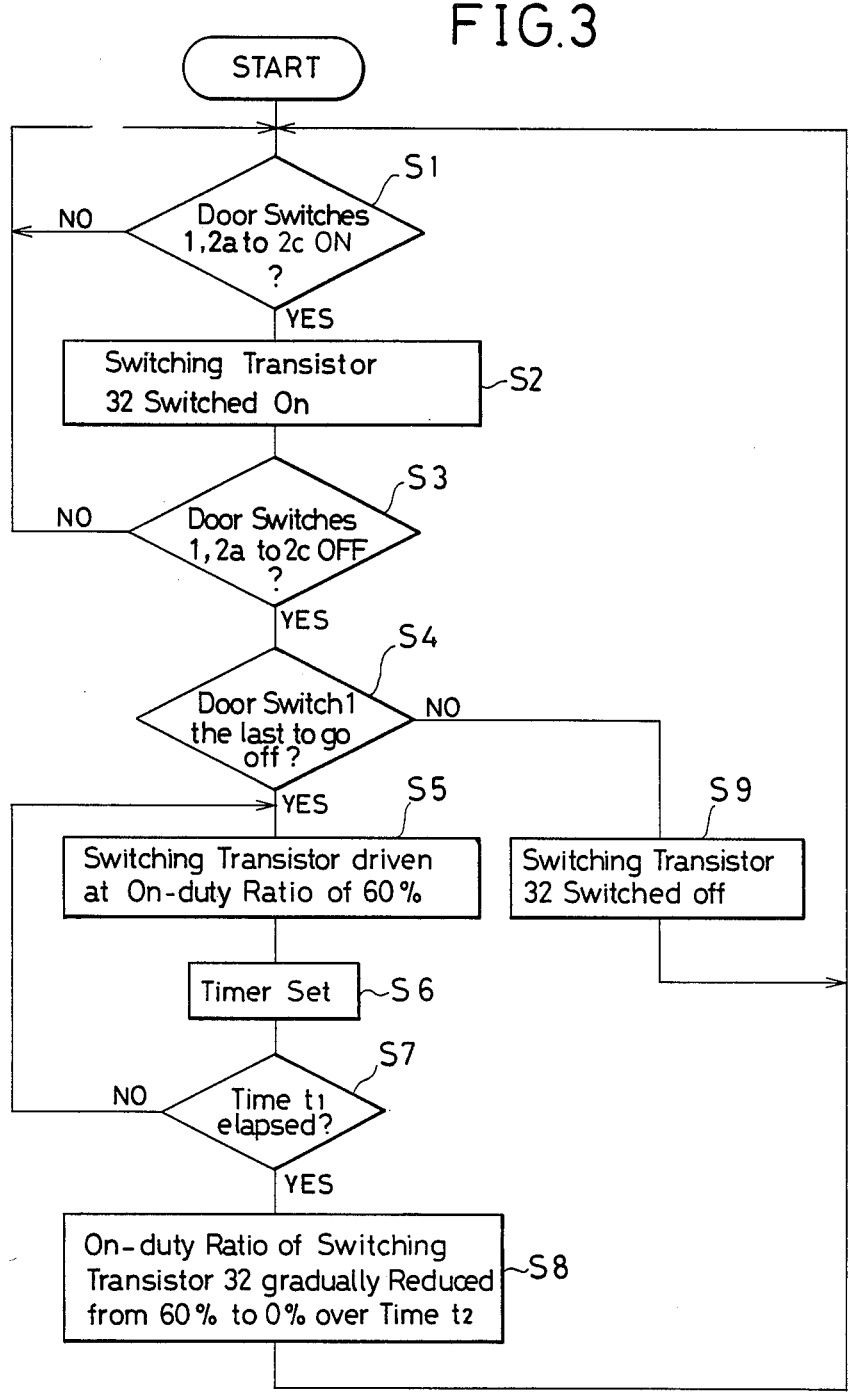
FIG. 3 is a flow chart of the embodiment of FIG. 2 that shows an example of the processing procedure of the embodiment of FIG. 2.

Now this embodiment is explained with the aid of the flow chart in FIG. 3. Note that the room lamp switch 4 is switched by changes in the door terminal position as shown in FIG. 2.

In step S1 a judgment is made as to whether the door switches 1 and 2a to 2c are on or not. If the judgment is positive then, in step S2, the switching transistor 32 is turned on by the lamp drive signal. When this happens, electricity from the battery 6 is conducted through the room lamp 5, and the room lamp 5 lights up.

Next, in step S3, a judgment is made as to whether the door switches 1 and 2a to 2c are off or not. If the judgment is positive, the system proceeds to step 4.

In step 4, a judgment is made as to whether or not the door switch 1 was the last one to go off. If the judgment is negative, then in step S9 the lamp drive signal falls and the switching transistor 32 goes off. That is to say, in the case in which a door other than the front door on the driver's seat side is the last to be closed, when all of the doors are closed, the room lamp goes off immediately. If the judgment in step S4 is positive, then the system proceeds to step S5.

In step S5, a lamp drive signal of on duty ratio 60% is output and the switching transistor 32 is duty-controlled. This reduces the room lamp 5 to 60% of its fully lighted illumination level. Then, in step S6 the timer is set, and in step S7 a judgment is made as to whether or not a certain period of time $t_1$ (for example 5 seconds) has elapsed. If the judgment is negative, then steps S5 to S7 are repeated. If the judgment in step S7 is positive, then the system proceeds to step S8, in which the on duty ratio of the lamp drive signal is gradually reduced from 60% to 0% over a period of time $t_2$ (for example 5 second). This reduces the illumination level of the room lamp 5 gradually until it goes off completely after the period of time $t_2$ has elapsed.

Now the operation of this device is explained referring to FIGS. 4(a) and (b), FIG. 5 and FIGS. 6(a) and (b).

As shown in FIG. 4(a), it is supposed that the front door on the driver's seat side opens at time T0 (the door switch 1 is on and the signal S1 is at low level), and closes (the door switch 1 is off and the signal S1 is at high level) at time T1 and that during this period of time all of the other doors are closed. As shown in FIG. 4(b), the switching transistor 32 is on from T0 to T1, that is to say, the on duty ratio is 100%.

As shown in FIG. 5, this period of time the room lamp 5 is lit up at 100% of full brightness, corresponding to the duty ratio. During the period of time $t_1$ from time T1 to time T2, the on duty ratio of the switching transistor 32 is set to be 60%, and the room lamp 5 remains lit up but at 60% of full brightness, as shown in FIG. 5.

During the period of time $t_2$ from T2 to T3, the on duty ratio of the switching transistor 32 is gradually reduced from 60% to 0%, so the room lamp 5, as shown in FIG. 5, gradually dims from the 60% brightness level until it goes off completely at time T3.

FIGS. 6(a) and (b) show what happens when a door other than the front door on the driver's seat side is the last to be closed. When the signal S2 obtained from the switches 2a to 2c switches from low level to high level, the on duty ratio of the switching transistor 32 becomes 0%, and the room lamp 5 goes off immediately.

Now another embodiment is explained. The hardware configuration is exactly the same as in the first embodiment; the only difference is in some of the steps of the processing procedure, so here only the differences are focused on.

Figure 7:
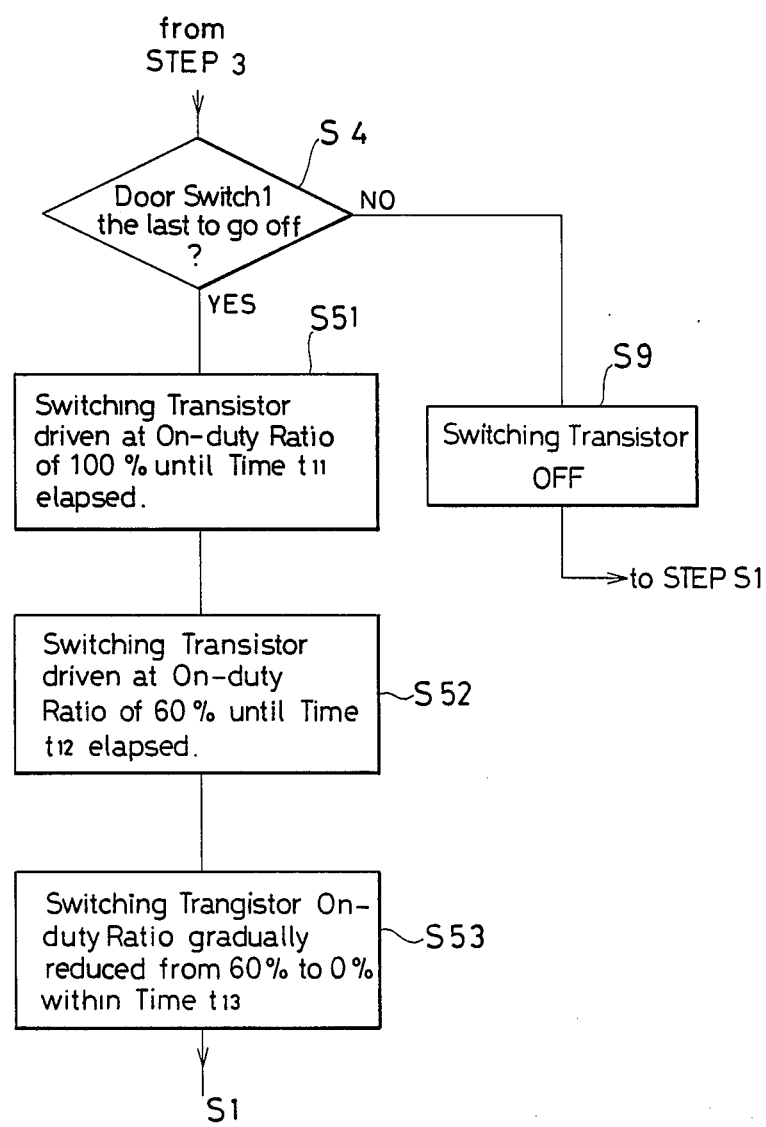
FIG. 7 is a flow chart of a second embodiment.
Figure 8:
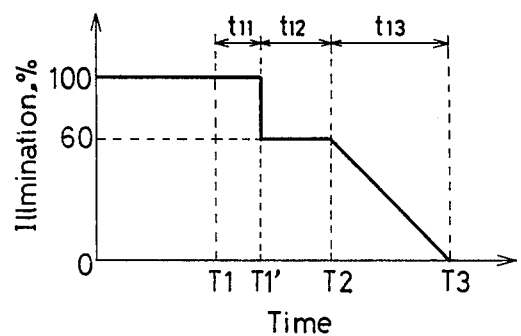
FIG. 8 shows the room lamp illumination characteristics corresponding to these second embodiment.

The second embodiment is explained referring to FIGS. 7 and 8. In FIG. 7, if the judgment in step S4 is positive, the system progresses to step S51. In step S51, during a period of time $t_{11}$ from time T1 (FIG. 8) when the front door on the driver's seat side is closed until time T1' the period of time $t_{11}$ might for example be 0.5 second), the on duty ratio of the switching transistor 32 remains at 100%, so that the room lamp 5 remains at 100% of full brightness. After the period of time $t_{11}$ has the system progresses to step S52 and the on duty ratio drops to 60%. This duty ratio is maintained for a period of time $t_{12}$ (for example 5 seconds). That is to say, between times T1' and T2 in FIG. 8 the room lamp 5 remains lit up at 60% of full brightness. When this period of time $t_{12}$ has elapsed, the system progresses to step S53 and the on duty ratio of the switching transistor 32 is gradually reduced from 60% to 0% over a succeeding period of time $t_{13}$ (for example 5 seconds). That is to say, between times T2 and T3 in FIG. 8 the illumination level of the room lamp 5 gradually drops from 60% to 0% of full brightness.

In this embodiment, the on duty ratio is maintained at 100% for the period of time $t_{11}$ after the door is closed, so even if there is chattering in the signal sent from the door switch 1, it will not have any effect on the system.

Figure 10:
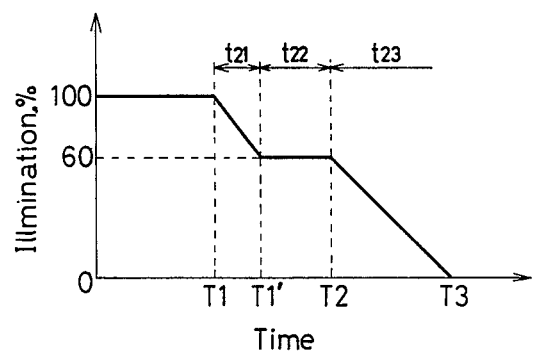
FIG. 10 shows the room lamp illumination characteristics corresponding to the third embodiment.
Figure 9:
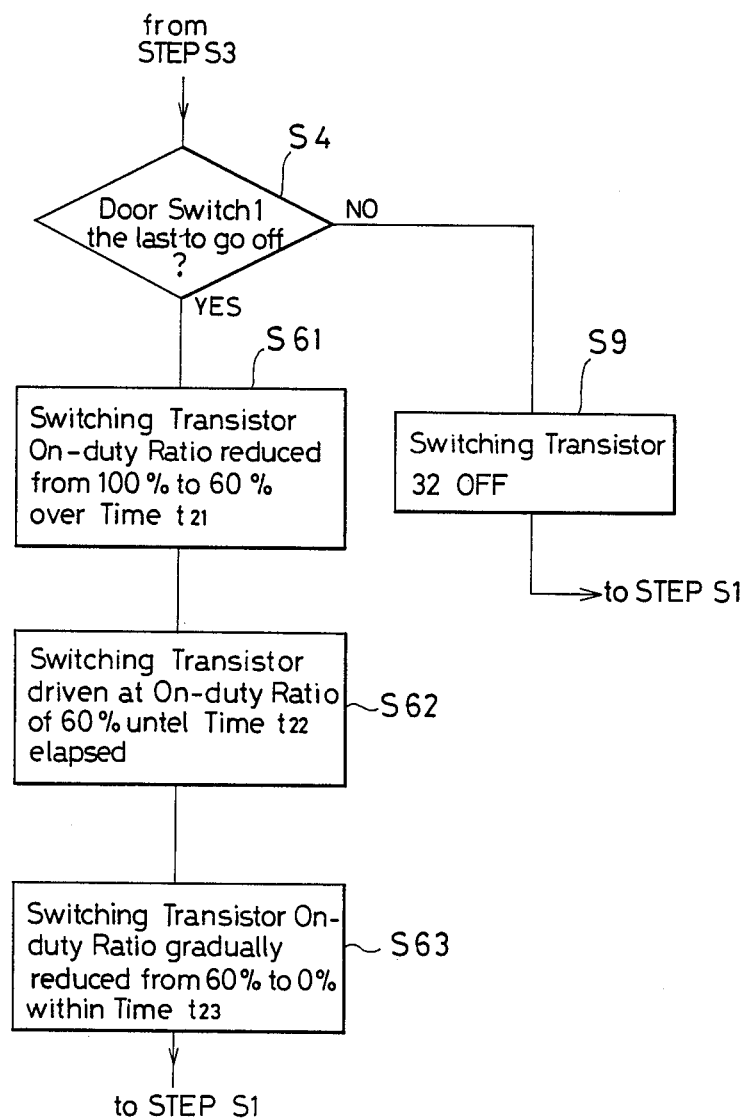
FIG. 9 is a flow chart for a third embodiment.

Now the third embodiment is explained referring to FIGS. 9 and 10. In FIG. 9, if the judgment in step S4 is positive, the system progresses to step S61. In step S61, the on duty ratio of the switching transistor 32 is gradually reduced from 100% to 60% during a period of time $t_{21}$ (for example 0.5 second) from time T1 (FIG. 10) at which the front door on the driver's seat side is closed until a slightly later time T1', so that, as shown in FIG. 10, the illumination level of the room lamp 5 drops from 100% to 60% of full brightness during this period of time. After the period of time $t_{21}$ has elapsed, the system progresses to step S62 and the on duty ratio is set at 60%. This duty ratio is maintained for a period of time $t_{22}$ (for example 5 seconds). That is to say, the illumination level of the room lamp 5 is maintained at 60% of full brightness from time T1' to time T2 in FIG. 10. When this period of time $t_{22}$ has elapsed, in step S63 the on duty ratio of the switching transistor 32 is reduced from 60% to 0% within a period of time interval $t_{23}$ (for example 5 seconds). That is to say, the illumination level of the room lamp 5 is gradually reduced from 60% to 0% of full brightness from time T2 to time T3 in FIG. 10.

The periods of time $t_{11}$, $t_{12}$, $t_{13}$, $t_{21}$, $t_{22}$, and $t_{23}$ in the embodiments described above is determined by a so-called software timer.

Since in this invention the illumination level of the room lamp is gradually reduced after the door is closed, the driver can, as in the conventional system, confirm from the reduction of light level that the door has closed securely, without suffering the inconvenience and annoyance caused by the blinking of the light off and back on due to the door operation as in the conventional system.

What is claimed is:

1. A vehicle room lamp shut-off device, comprising:
   a switching means for outputting a signal responsive to the opening and closing of the vehicle door;
   a room lamp switched on and off in response to said signal from said switching means; and
   a room lamp control means for receiving said signal from said switching means to reduce the illumination of said room lamp directly to a preset intermediate level in response to the door closing and hold it there for a first preset period of time, then gradually reduce said room lamp illumination lever over a second preset period of time until it is shut off completely at the end of said second preset period of time.

2. A method of shutting off a vehicle room lamp, comprising the steps of:
   reducing the room lamp illumination from full brightness to a preset intermediate level when the door is closed,
   holding the illumination constant for a first preset period of time, and
   gradually reducing the illumination level to zero over a second preset period of time.

3. The method of claim 2, further including the step of gradually reducing the illumination from full brightness to said preset intermediate level over a preset period of time after said door is closed.

4. The method of claim 2 wherein the drop of illumination from full brightness to said preset intermediate level occurs simultaneously when said door is closed.

5. The method of claim 2 wherein the drop of illumination from full brightness to said preset intermediate level occurs when a finite time has elapsed after said door is closed.

6. The shut off device of claim 1, wherein the intermediate illumination level is approximately 60% of the full illumination level.

7. The method of claim 2, wherein the intermediate brightness level is 60% of the full brightness of the room lamp.

8. The shut off device of claim 1, wherein a reduction of illumination to a preset intermediate level gradually occurs over a preset period of time after the door is closed.

9. The shut off device of claim 1, wherein the drop of illumination from full brightness to the preset intermediate level occurs instantaneously when the door is closed.

10. The vehicle shut off device of claim 1, wherein the reduction of illumination from full brightness to the preset intermediate level occurs a finite time after the door is closed.

* * * * *